(12) United States Patent
Hiruma

(10) Patent No.: US 8,693,650 B2
(45) Date of Patent: Apr. 8, 2014

(54) FACSIMILE APPARATUS, CONTROL METHOD THEREFOR, AND STORAGE MEDIUM

(75) Inventor: Junichi Hiruma, Hidaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/352,872

(22) Filed: Jan. 18, 2012

(65) Prior Publication Data
US 2012/0207293 A1 Aug. 16, 2012

(30) Foreign Application Priority Data
Feb. 10, 2011 (JP) ................... 2011-027846

(51) Int. Cl.
*H04M 11/00* (2006.01)
(52) U.S. Cl.
USPC ................... 379/100.16; 379/100.17
(58) Field of Classification Search
USPC .................................. 379/100.16
See application file for complete search history.

(56) References Cited

U.S. PATENT DOCUMENTS 5,293,575 A * 3/1994 Hirai ................. 379/100.16

FOREIGN PATENT DOCUMENTS

JP 05-244303 9/1993

* cited by examiner

*Primary Examiner* — Alexander Jamal
(74) *Attorney, Agent, or Firm* — Cowan, Liebowitz & Latman, P.C.

(57) ABSTRACT

There is a need to provide a technique of accurately detecting an identification signal representing that the partner performs facsimile communication, by using an appropriate detection filter in accordance with the operation mode in a facsimile apparatus. Based on whether the FAX/TEL mode (first mode) or the TEL answering mode (second mode) is set as the operation mode, a facsimile apparatus according to this invention determines whether a band-pass filter and band-reject filter are to be used. The facsimile apparatus detects a CNG based on the signal detection result using the determined filter.

7 Claims, 7 Drawing Sheets

FIG. 5
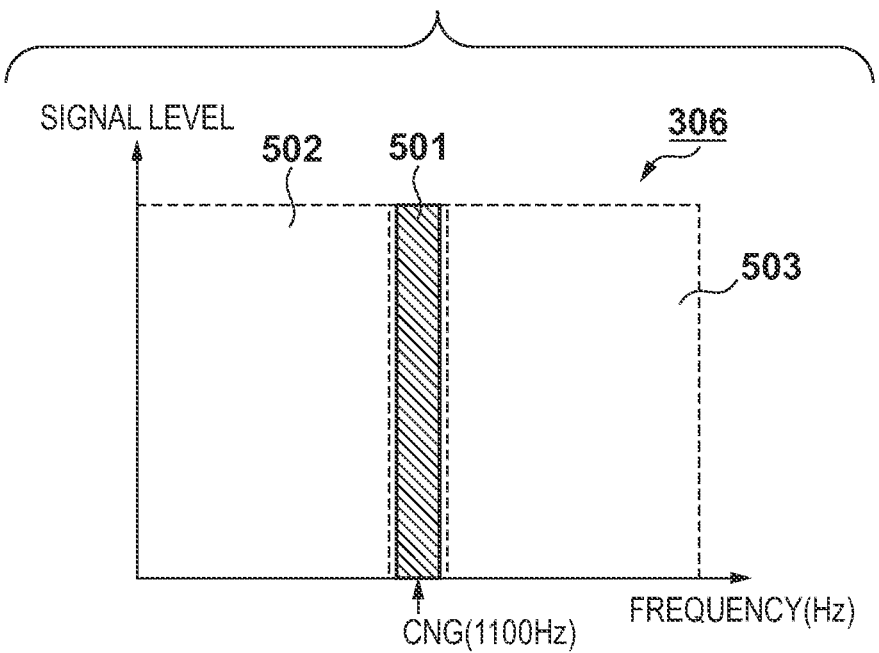
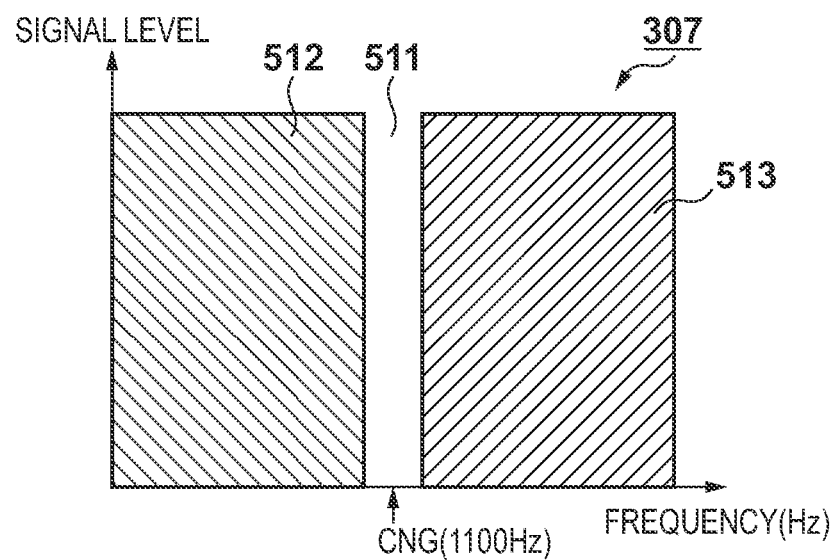

FIG. 6
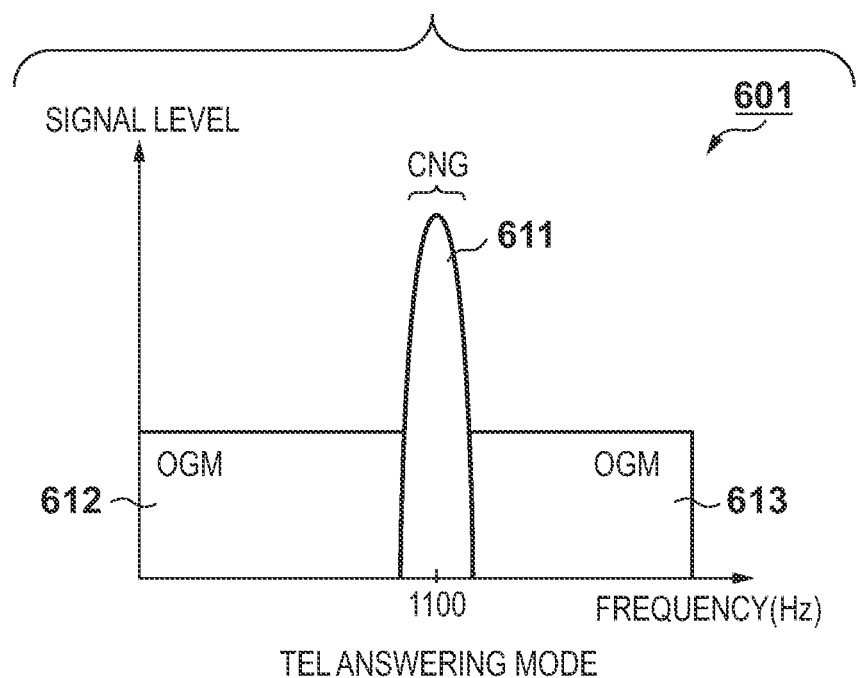
TEL ANSWERING MODE
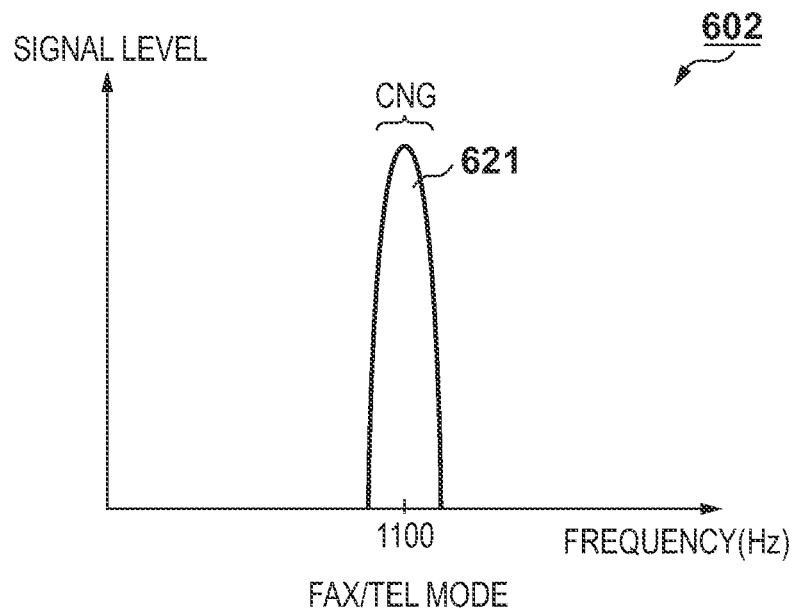
FAX/TEL MODE

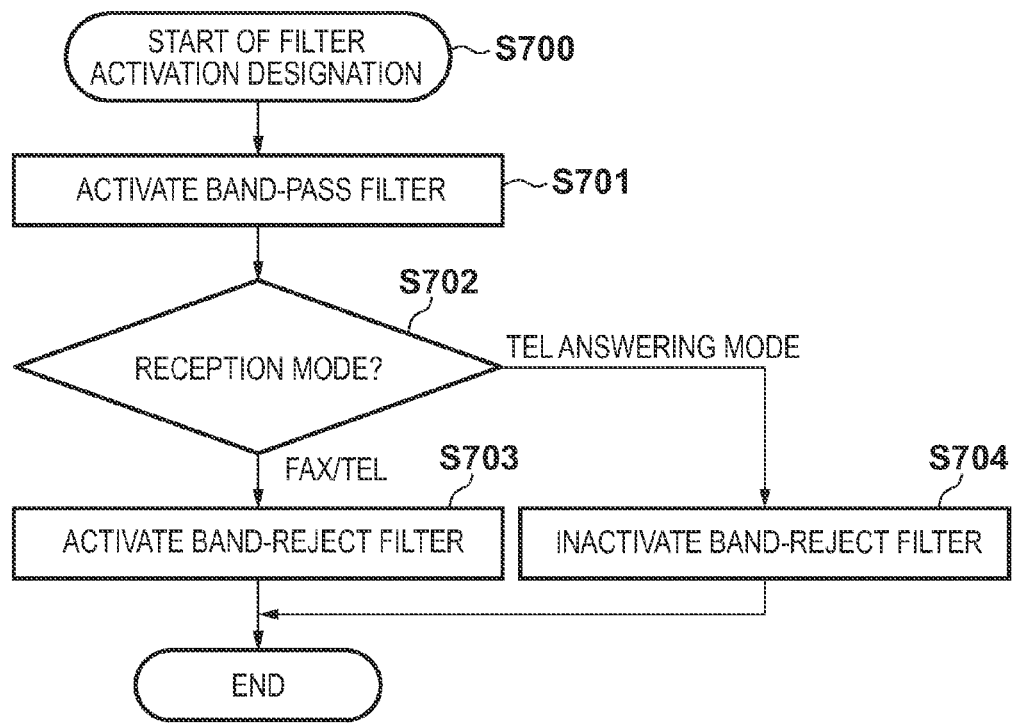
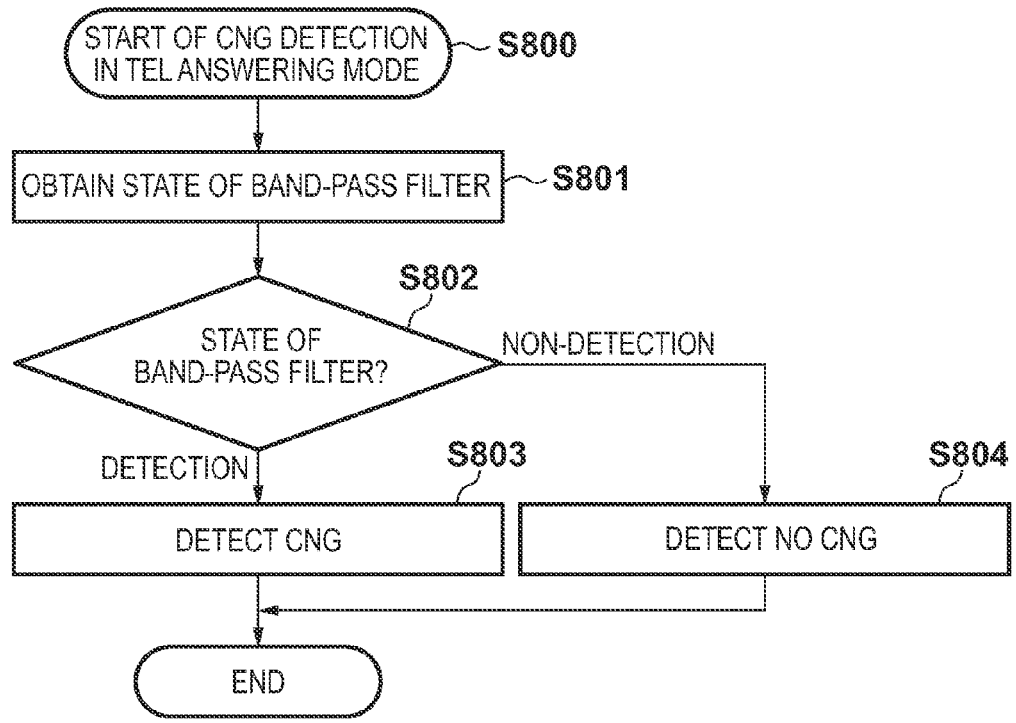

FACSIMILE APPARATUS, CONTROL METHOD THEREFOR, AND STORAGE MEDIUM

BACKGROUND OF THE INVENTION

1. Field of the Invention

The present invention relates to a facsimile apparatus, control method therefor, and storage medium.

2. Description of the Related Art

There has conventionally been known a technique of transmitting/receiving facsimile data between a transmitting side terminal and a receiving side terminal by facsimile communication with partner terminals via switching equipment. In facsimile communication, first, the facsimile apparatus of the transmitting side terminal captures a telephone line used in facsimile communication. Then, the transmission side facsimile apparatus dials the telephone number of the receiving side terminal serving as a facsimile data transmission destination, and transmits a Calling (CNG) signal.

The CNG signal is a signal which is transmitted first at the start of a facsimile communication procedure by a transmitting side facsimile apparatus. The CNG signal notifies a receiving side terminal that the calling station is a non-voice terminal. When the receiving side terminal includes a facsimile apparatus for facsimile communication and a telephone set for voice communication which is connected to the facsimile apparatus, it can determine, based on the received CNG signal, whether the facsimile apparatus or telephone set is to be used. To make this determination, the receiving side terminal needs to detect the CNG signal passing through the line at high accuracy.

As a technique for detecting a CNG signal in a facsimile apparatus, there has been proposed a technique in Japanese Patent Laid-Open No. 05-244303. In this literature, digital filters are used to detect reception signals in the frequency band of a tonal signal (for example, CNG signal) to be detected and the remaining frequency band. A tonal signal is detected based on the detection states of signals in the respective digital filters. More specifically, when a digital filter corresponding to the frequency (for example, 1,100 Hz) of the CNG signal detects a signal and the remaining digital filters do not detect a signal, the facsimile apparatus determines that the CNG signal has been detected.

The technique in Japanese Patent Laid-Open No. 05-244303 may be unable to properly detect the CNG depending on a reception control method (reception mode) used in a receiving side facsimile apparatus. In general, the facsimile apparatus uses, as reception modes (operation modes), a "TEL answering mode", "FAX/TEL mode", and "automatic reception mode", which will be described later. For example, when the receiving side facsimile apparatus is set in the TEL answering mode, a telephone set which is connected to the receiving side facsimile apparatus and has a recording function executes an off-hook operation and starts recording a signal (voice signal) transmitted from a transmitting side facsimile apparatus. If the receiving side facsimile apparatus detects the CNG signal during recording, it switches the service from the telephone set to the facsimile apparatus, and receives the signal from the transmitting side terminal.

In this case, the telephone set (slave telephone) connected to the receiving side facsimile apparatus often transmits an Outgoing Message (OGM) to the transmitting side facsimile apparatus during recording in the telephone set. The OGM is a series of voice signals transmitted to a partner terminal, and is transmitted using the whole frequency band of the voice signal. When the TEL answering mode is used, the line becomes unclear because the OGM transmitted from the telephone set and the CNG signal transmitted from the transmitting side facsimile apparatus coexist in the frequency band of the voice signal on the line.

It is difficult to appropriately detect the CNG signal by a facsimile apparatus set in the TEL answering mode according to the technique in Japanese Patent Laid-Open No. 05-244303. In the facsimile apparatus, even if a digital filter corresponding to the frequency of the CNG signal detects a signal, a digital filter corresponding to another frequency detects the OGM signal. As a result, no CNG signal can be detected. Hence, the facsimile apparatus cannot properly detect the CNG signal depending on a set operation mode.

SUMMARY OF THE INVENTION

The present invention has been made to solve the above-described problems, and provides a technique of accurately detecting a CNG signal using an appropriate detection filter in accordance with the operation mode in a facsimile apparatus.

According to one aspect of the present invention, there is provided a facsimile apparatus which starts facsimile communication upon detecting a CNG signal transmitted from a caller apparatus, comprising: a determination unit that determines whether a first mode or a second mode is set as an operation mode of the facsimile apparatus; and a detection unit that, when the determination unit determines that the operation mode is the first mode, detects the CNG signal using a first detection unit that detects a signal of a frequency band corresponding to the CNG signal and a second detection unit that detects a signal of a frequency band other than the frequency band corresponding to the CNG signal, and when the determination unit determines that the operation mode is the second mode, detects the CNG signal using the first detection unit without using the second detection unit.

According to another aspect of the present invention, there is provided a method for controlling a facsimile apparatus which starts facsimile communication upon detecting a CNG signal transmitted from a caller apparatus, comprising: determining whether a first mode or a second mode is set as an operation mode of the facsimile apparatus; and when the operation mode is determined in the determining whether a first mode or a second mode is set, to be the first mode, detecting the CNG signal using a first detection unit that detects a signal of a frequency band corresponding to the CNG signal and a second detection unit that detects a signal of a frequency band other than the frequency band corresponding to the CNG signal, and when the operation mode is determined to be the second mode, detecting the CNG signal using the first detection unit without using the second detection unit.

The present invention can provide a technique of accurately detecting a CNG signal using, for example, an appropriate detection filter in accordance with the operation mode in a facsimile apparatus.

Further features of the present invention will become apparent from the following description of exemplary embodiments (with reference to the attached drawings).

BRIEF DESCRIPTION OF THE DRAWINGS

FIG. 5 is a graph conceptually showing a filter used to detect the CNG signal in the facsimile apparatus 100 according to the embodiment of the present invention;

FIG. 6 is a graph exemplifying the state of a signal on the line in accordance with the reception mode of the facsimile apparatus 100 according to the embodiment of the present invention;

FIG. 7 is a flowchart showing a processing sequence to select a filter in accordance with the reception mode, which is executed in the facsimile apparatus 100 according to the embodiment of the present invention;

FIG. 8 is a flowchart showing a processing sequence to detect the CNG signal based on the signal detection state of the filter, which is executed when the reception mode is the TEL answering mode in the facsimile apparatus 100 according to the embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of Facsimile Apparatus 100>

Figure 1:
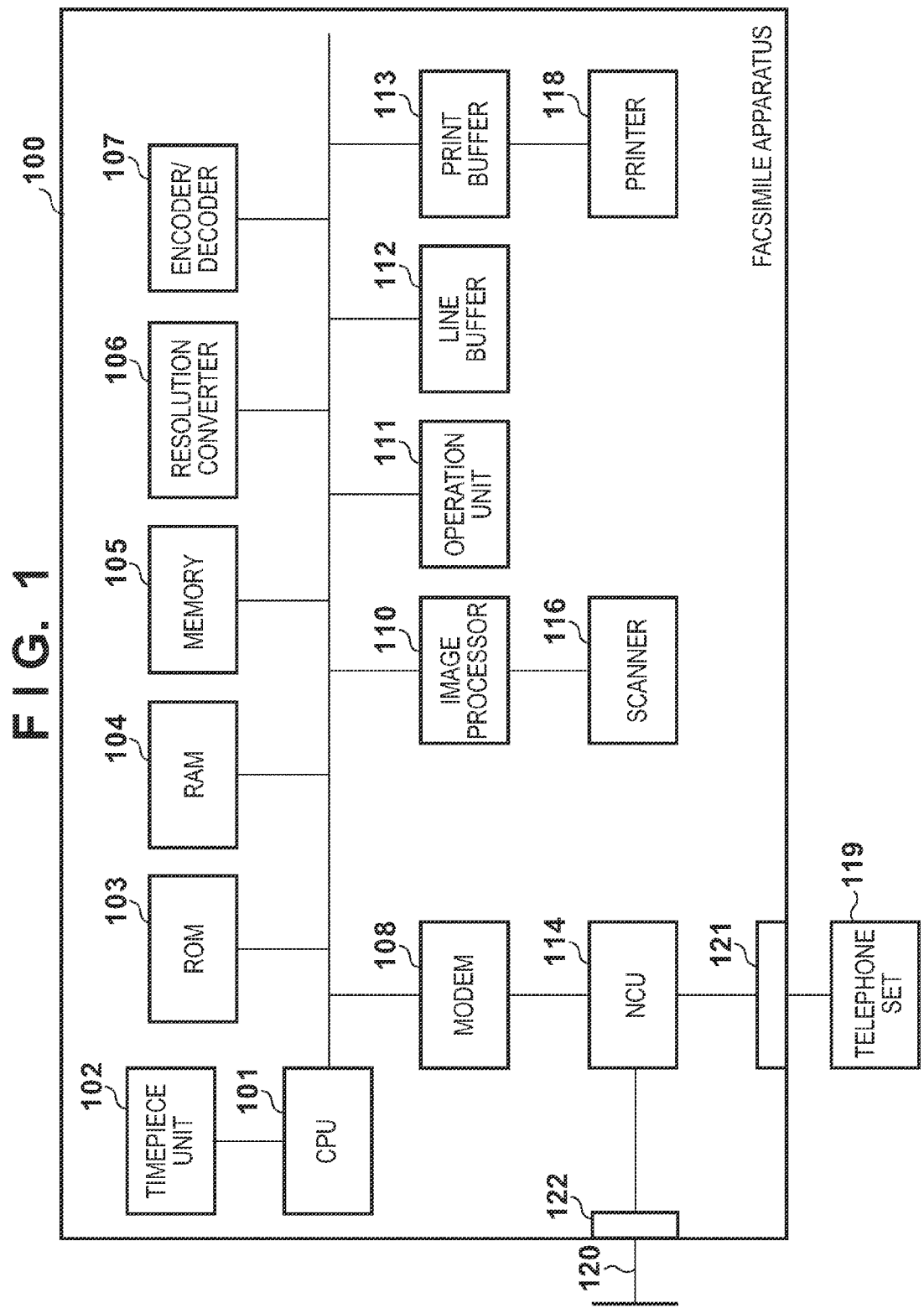
FIG. 1 is a block diagram showing the system configuration of a facsimile apparatus 100 according to an embodiment of the present invention.

FIG. 1 is a block diagram showing the system configuration of a facsimile apparatus 100 according to an embodiment of the present invention. The facsimile apparatus 100 has a facsimile function of performing facsimile communication to transmit/receive facsimile data, and a telephone function of performing voice communication. A CPU 101 is a system controller, and controls the overall facsimile apparatus 100. A ROM 103 stores a plurality of control programs for implementing respective functions provided by the facsimile apparatus 100. A RAM 104 is formed from an SRAM or the like. The RAM 104 can store various data such as image data and setting information, and can also be used as a work area for the CPU 101. A memory 105 is formed from a DRAM or the like, and can store various data such as image data and communication management information. The CPU 101 reads out a control program from the ROM 103 to the RAM 104 and executes it, thereby implementing each function of the facsimile apparatus 100.

A resolution converter 106 performs resolution conversion processing to convert the resolution of image data to be transmitted to a partner terminal into a resolution receivable by the partner terminal. An encoder/decoder 107 performs processing to encode/decode image data handled in the facsimile apparatus 100. A modem 108 performs demodulation processing for a signal received via a public line (switching equipment) and modulation processing for a signal to be transmitted to the public line.

An Network Control Unit (NCU) 114 functions as an interface between the facsimile apparatus 100 and the public line. The NCU 114 is connected to an external telephone set 119 via a connection terminal 121, and a line 120 via a connection terminal 122. The line 120 is connected to a public network, private branch exchange, and the like.

The telephone set 119 is connected to the connection terminal 121 of the facsimile apparatus 100. The telephone set 119 is connected to the line 120 via the NCU 114, and further to the public network via the line 120. The telephone set 119 has a telephone function of enabling voice communication with a partner terminal via switching equipment connected to the public network. The telephone set 119 is, for example, a handset type telephone set having no dialer or a telephone set having a dialer. Further, the telephone set 119 has a telephone answering function of storing a voice signal transmitted via the line 120 so that it can be played back later.

Note that the facsimile apparatus 100 may be connected to a plurality of lines. In this case, the facsimile apparatus 100 includes a plurality of NCUs, and a plurality of connection terminals so that a plurality of telephone sets can be connected in correspondence with the plurality of lines. In this case, the respective NCUs independently detect the on-hook/off-hook operations of different connected telephone sets.

A scanner 116 includes an image sensor, document feeding mechanism, and the like. The scanner 116 optically reads an image on a document, converts it into electrical image data, and inputs the image data to the facsimile apparatus 100. An image processor 110 performs various image processes such as correction processing for the image data read by the scanner 116. An operation unit 111 includes a keyboard, liquid crystal display, and the like. The operation unit 111 accepts various operations by the user, and sends operation information representing an accepted operation to the CPU 101. For example, when making a call on the telephone set or facsimile apparatus, the user inputs a telephone number by operating the operation unit 111.

A line buffer 112 is a buffer memory used to buffer image data when performing image data transfer control. A print buffer 113 is a buffer memory for storing a printing character code, and can store data of one page. A printer 118 prints an image on a printing medium such as printing paper using image data. For example, the printer 118 prints using image data received by facsimile communication.

Figure 2:
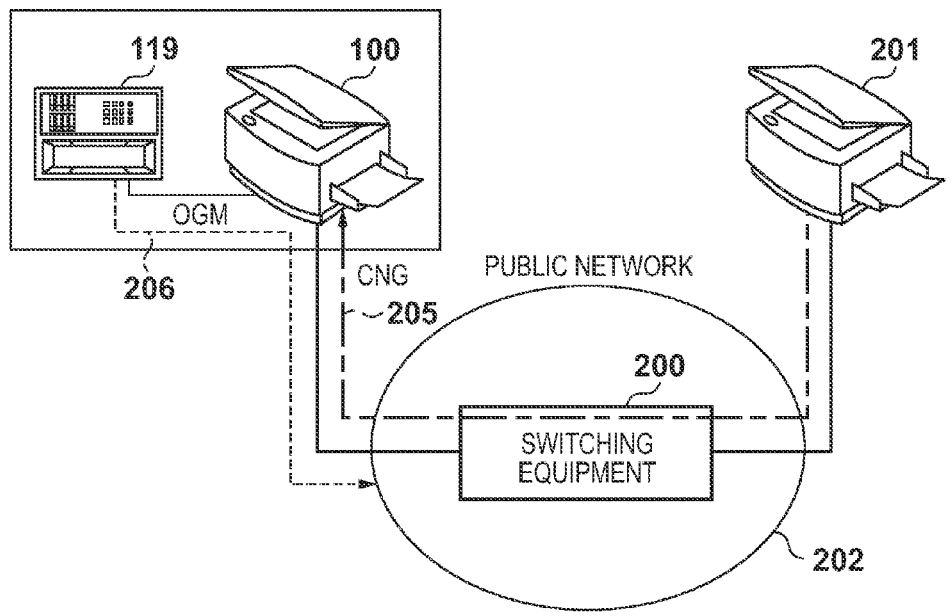
FIG. 2 is a view showing the schematic configuration of a network including the facsimile apparatus 100 according to the embodiment of the present invention.

FIG. 2 is a view showing the schematic configuration of a network to which the facsimile apparatus 100 according to the embodiment is connected. The facsimile apparatus 100 is connected to a public network 202, and can perform facsimile communication via the public network 202 with another facsimile apparatus 201 having the facsimile function. A line for facsimile communication between the facsimile apparatuses 100 and 201 can be established by the switching function of switching equipment 200 in the public network 202.

When performing facsimile communication between the facsimile apparatuses 100 and 201, the transmitting side apparatus transmits, to the receiving side apparatus, a CNG signal 205 representing that the transmitting side apparatus is a non-voice terminal and performs facsimile communication. The CNG signal 205 corresponds to an identification signal indicating facsimile communication, and is generally a 1100-Hz tone signal which is transmitted intermittently. When the facsimile apparatus 100 detects the CNG signal 205 from the facsimile apparatus 201 serving as a caller apparatus, it starts facsimile communication with the facsimile apparatus 201.

As described above, the facsimile apparatus 100 uses several reception modes (operation modes) as the reception control method. A "TEL answering mode", "FAX/TEL mode", and "automatic reception mode" are used in general. The state of a signal present on the line between the receiving side facsimile apparatus 100 and the transmitting side facsimile apparatus 201 changes depending on a reception mode used in the receiving side facsimile apparatus 100. More specifically, the state changes between a (clear) state in which only the CNG signal passes through the line and a (unclear) state in which both the CNG signal and voice signal pass through the line. The situation in which the facsimile apparatus 100 detects the CNG signal can change as follows depending on a reception mode used in the receiving side facsimile apparatus 100. In the embodiment, the TEL answering mode corresponds to the second mode, and the FAX/TEL mode corresponds to the first mode.

(1) TEL Answering Mode

As described above, in the TEL answering mode, the telephone set 119 can transmit an OGM 206 to the facsimile apparatus 201 during recording in the telephone set 119 connected to the facsimile apparatus 100. The OGM 206 is a response message which is recorded on a recording tape in advance by the user operation in the telephone set 119. The OGM 206 is a voice message regarding the telephone answering function of the telephone set 119. The OGM 206 is transmitted from the telephone set 119 to the facsimile apparatus 201 via the facsimile apparatus 100 using the frequency band of the CNG signal 205 and another frequency band out of the frequency band of the voice signal. In this case, the line becomes unclear because the OGM 206 transmitted from the telephone set 119 and the CNG signal 205 transmitted from the transmitting side facsimile apparatus 201 coexist in the frequency band of the voice signal on the line.

(2) FAX/TEL Mode

In the FAX/TEL mode, the receiving side facsimile apparatus 100 transmits a ringback tone to the transmitting side facsimile apparatus 201 after off-hook. The ringback tone is a signal (ringing tone) representing that the user is being called now on (the telephone set 119 connected to) the receiving side facsimile apparatus 100. When the receiving side facsimile apparatus 100 detects that the user has picked up the receiver of the telephone set 119, the receiving side facsimile apparatus 100 performs the off-hook operation of the telephone set 119 and starts voice communication with the transmitting side facsimile apparatus 201. When the receiving side facsimile apparatus 100 detects the CNG signal 205 during transmission of the ringback tone to the transmitting side facsimile apparatus 201, it starts facsimile communication. In this manner, the ringback tone is transmitted at a timing other than the detection timing of the CNG signal 205.

In the FAX/TEL mode, the receiving side facsimile apparatus 100 detects the CNG signal 205 during transmission of the ringback tone. In this state, if the user of the partner terminal does not speak, no voice signal exists on the line and the line maintains a clear state. If the user of the partner terminal speaks, the voice signal and CNG signal 205 coexist on the line and the line may become unclear.

(3) Automatic Reception Mode

In the automatic reception mode, the receiving side facsimile apparatus 100 operates not to perform an operation other than facsimile communication. In this case, the facsimile apparatus 100 automatically executes a facsimile reception operation upon receiving an incoming call, and does not detect the CNG signal 205.

In this fashion, especially when the facsimile apparatus 100 is set in the TEL answering mode, the OGM 206 transmitted from the telephone set 119 and the CNG signal 205 coexist on the line, and the detection accuracy of the CNG signal 205 from the facsimile apparatus 201 may degrade. To improve the detection accuracy of the CNG signal 205, the facsimile apparatus 100 according to the embodiment selects a filter to be used to detect the CNG signal 205 in accordance with the reception mode of the facsimile apparatus 100, which will be described later.

<Software Configuration of Facsimile Apparatus 100>

Figure 3:
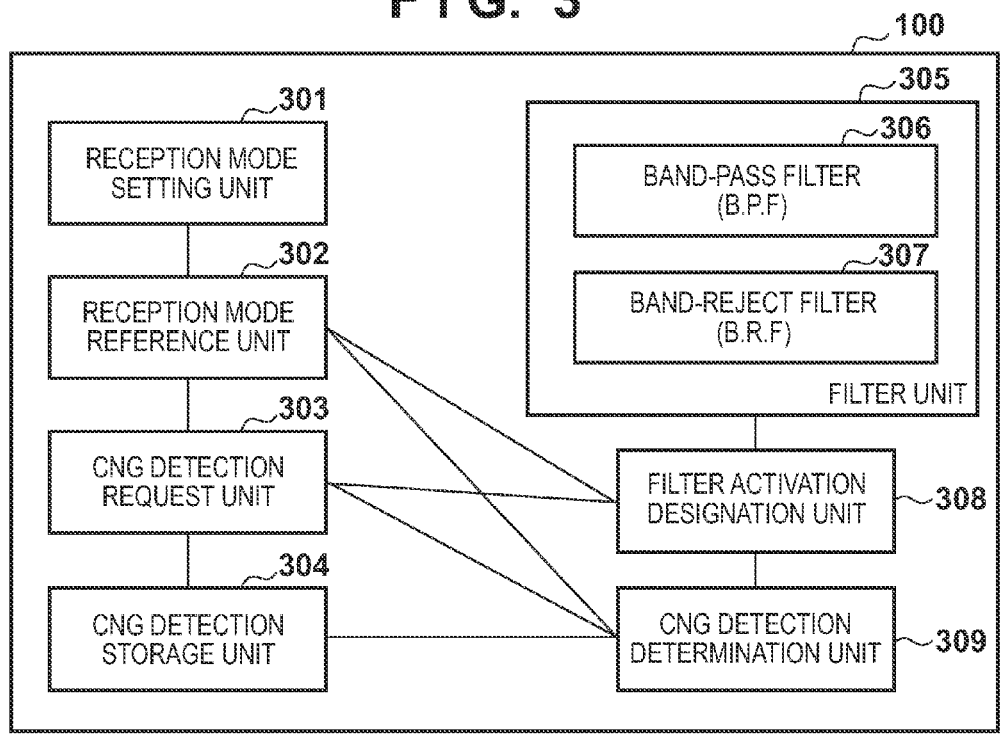
FIG. 3 is a block diagram showing the configuration of software for executing functions regarding detection of the CNG signal in the facsimile apparatus 100 according to the embodiment of the present invention.

FIG. 3 is a block diagram showing the configuration of software for executing functions regarding detection of the CNG signal in the facsimile apparatus 100. The function of each functional unit described below is executed when the CPU 101 reads out and executes a control program stored in the ROM 103.

A reception mode setting unit 301 sets a reception mode in the facsimile apparatus 100. Depending on the reception mode setting by the reception mode setting unit 301, it is set to use the telephone set 119 connected to the facsimile apparatus 100 when the facsimile apparatus 100 performs voice communication other than facsimile communication. By referring to information stored in the RAM 104 or the like, a reception mode reference unit 302 obtains and provides information about the reception mode set by the reception mode setting unit 301.

A CNG detection request unit 303 issues requests regarding CNG detection to a filter activation designation unit 308 and CNG detection determination unit 309, both of which will be described later. A CNG detection storage unit 304 saves (stores) a CNG detection result determined by the CNG detection determination unit 309 to be described later.

A filter unit 305 includes a band-pass filter 306 and band-reject filter 307. The band-pass filter 306 and band-reject filter 307 are used to detect a signal received via the line 120 (FIG. 5). The band-pass filter 306 and band-reject filter 307 are used to determine whether the CNG signal has been detected. As will be described later, the states (signal detection state or not) of the band-pass filter 306 and band-reject filter 307 are used as the determination criteria in accordance with a set reception mode.

The filter activation designation unit 308 designates whether to use (activate) the band-pass filter 306 and band-reject filter 307 in accordance with a reception mode indicated by information obtained by the reception mode reference unit 302. Details of the filter activation designation will be described later with reference to FIG. 7. Based on information about the signal detection state of a filter activated by the filter activation designation unit 308, the CNG detection determination unit 309 determines whether the CNG signal has been detected. Details of the CNG signal detection will be described later with reference to FIGS. 8 and 9.

<CNG Signal Detection Processing>

Figure 4:
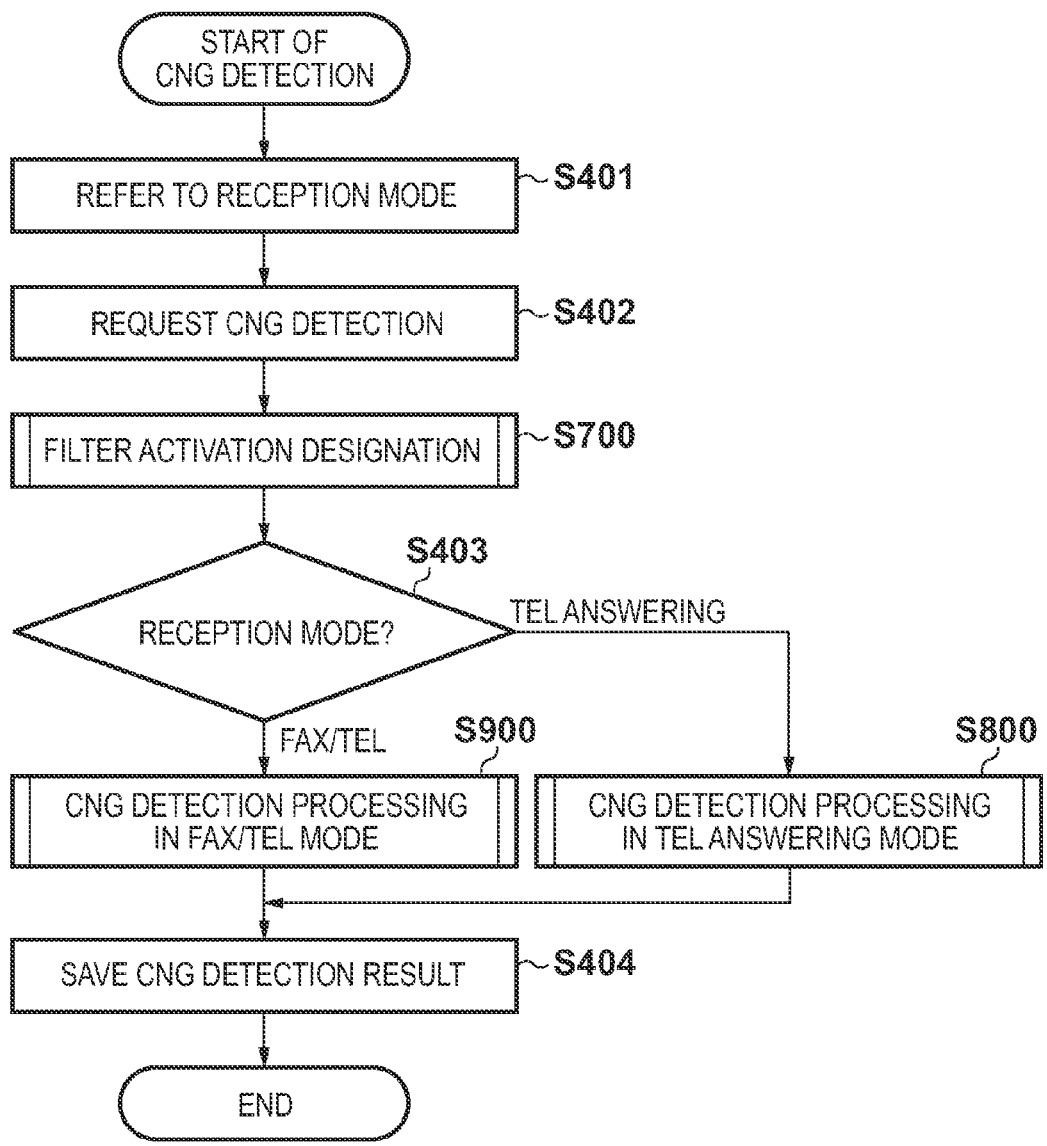
FIG. 4 is a flowchart showing a processing sequence to detect the CNG signal, which is executed in the facsimile apparatus 100 according to the embodiment of the present invention.

FIG. 4 is a flowchart showing a processing sequence executed in the facsimile apparatus 100 to detect the CNG signal (to be simply referred to as "CNG"). A series of operations shown in FIG. 4 is implemented when the CPU 101 of the facsimile apparatus 100 reads out and executes a control program stored in the ROM 103 (executes the function of each functional unit shown in FIG. 3).

First, in step S401, the reception mode reference unit 302 obtains, from the RAM 104 or the like, information about a reception mode (operation mode) set by the reception mode setting unit 301. Then, the CPU 101 advances the process to step S402. In step S402, the CNG detection request unit 303 requests the filter activation designation unit 308 to activate a filter corresponding to a reception mode indicated by the information obtained by the reception mode reference unit 302, and then advances the process to step S700.

In step S700, the filter activation designation unit 308 activates or inactivates each of the band-pass filter 306 and band-reject filter 307 in accordance with the reception mode setting. As a result, a filter to be used for CNG detection is determined in each reception mode. Note that details of the processing in step S700 will be described later with reference to FIG. 7. Thereafter, the CPU 101 advances the process to step S403.

In step S403, the CNG detection determination unit 309 determines a currently set reception mode. If the CNG detection determination unit 309 determines that the set reception mode is the FAX/TEL mode, it advances the process to step S900 and starts CNG detection processing in the FAX/TEL mode. If the CNG detection determination unit 309 determines in step S403 that the set reception mode is the TEL answering mode, it advances the process to step S800 and starts CNG detection processing in the TEL answering mode. Details of the processes in steps S900 and S800 will be described later with reference to FIGS. 9 and 8. Upon completion of step S900 or S800, the CPU 101 advances the process to step S404. The CNG detection determination unit 309 (CPU 101) is an example of an identification signal detection unit.

Finally, in step S404, the CNG detection storage unit 304 saves the CNG detection result determined by the CNG detection determination unit 309. The CPU 101 then ends a series of processes shown in the flowchart of FIG. 4.

<Functions of Band-Pass Filter 306 and Band-Reject Filter 307>

FIG. 5 is a graph conceptually showing the signal detection characteristics of the band-pass filter 306 and band-reject filter 307 used for CNG detection in the facsimile apparatus 100. The ordinate represents the signal level, and the abscissa represents the frequency. In FIG. 5, regions 501 to 503 in the band-pass filter 306, and regions 511 to 513 in the band-reject filter 307 are the signal detection regions of the respective filters that are set to determine whether the CNG has been detected.

In the band-pass filter 306, the region 501 has a predetermined bandwidth including a CNG frequency of 1,100 Hz, and is used to detect a signal having a frequency within this region. Note that the region 501 desirably has a bandwidth which includes 1,100 Hz and is as narrow as possible not to erroneously detect a signal other than the CNG. The regions 502 and 503 are used to detect signals lower and higher in frequency than in the region 501.

The band-pass filter 306 transmits a signal only in the region 501 including the frequency of interest (1,100 Hz of the CNG), and detects the signal passing through this region. Upon detecting the signal, the band-pass filter 306 outputs a signal indicating the signal detection state. More specifically, when the band-pass filter 306 detects a signal in the region 501, it changes to the detection state; otherwise, to the non-detection state in which no signal is detected.

The regions 511 to 513 in the band-reject filter 307 correspond to the regions 501 to 503 in the band-pass filter 306, respectively. The band-reject filter 307 transmits a signal in the region 512 or 513 other than the region 511 including the frequency of interest (1,100 Hz of the CNG), and detects the signal passing through the region 512 or 513. Upon detecting the signal, the band-reject filter 307 outputs a signal indicating the signal detection state. More specifically, when the band-reject filter 307 detects a signal in the region 512 or 513 corresponding to frequencies other than those of the region 511, it changes to the detection state; otherwise, to the non-detection state.

FIG. 6 conceptually shows, for each reception mode, the state of a signal assumed to flow through the line at the timing when the facsimile apparatus 100 executes CNG detection. The ordinate represents the signal level, and the abscissa represents the frequency. In FIG. 6, reference numerals 601 and 602 denote cases in which the TEL answering mode and FAX/TEL mode are set as the reception mode, respectively.

When the reception mode is the TEL answering mode (601), a slave telephone (telephone set 119) connected to the facsimile apparatus 100 often supplies the OGM (voice response) to the line at the CNG detection timing in the facsimile apparatus 100. In 601, a region 611 indicates the CNG, and regions 612 and 613 indicate the OGM. In this way, the CNG and OGM often simultaneously flow through the line in the TEL answering mode. When the facsimile apparatus 100 detects the CNG, the OGM may inhibit the detection.

To the contrary, when the reception mode is the FAX/TEL mode (602), the facsimile apparatus 100 cannot transmit a signal (ringback tone) to the facsimile apparatus 201 serving as a caller apparatus at the CNG detection timing in the facsimile apparatus 100. In other words, a signal such as the OGM in the TEL answering mode does not flow through the line at the CNG detection timing, and such a signal is highly likely not to exist as a noise component on the line. In this case, no signal exists on the line, except for the CNG in a region 621, as represented by 602.

The embodiment utilizes the fact that no signal exists in a frequency band except for the CNG frequency band when the reception mode is the FAX/TEL mode, in order to improve the CNG detection accuracy. More specifically, the band-pass filter 306 is used to detect a signal in the CNG frequency band, and the band-reject filter 307 is used to determine that no signal is detected in a frequency band except for the CNG frequency band. Whether the CNG has been detected is determined from the detection results of these two filters, thereby improving the CNG detection accuracy.

In contrast, when the reception mode is the TEL answering mode, only the band-pass filter 306 is used by taking account of the presence of a signal (OGM) even in a frequency band other than the CNG frequency band. This is because, if the band-reject filter 307 is used as in the FAX/TEL mode, it detects the signal (OGM) in a frequency band other than the CNG frequency band, degrading the CNG detection accuracy. In the TEL answering mode, whether the CNG has been detected is determined from only the signal detection result of the band-pass filter 306, preventing degradation of the CNG detection accuracy.

As described above, in the embodiment, an appropriate filter is used in accordance with a set reception mode, and the CNG is detected based on the signal detection result of the filter used. This improves the CNG detection accuracy.

<Filter Activation Designation>

FIG. 7 is a flowchart showing a processing sequence executed by the filter activation designation unit 308 of the facsimile apparatus 100. In this flowchart, a filter to be used to detect the CNG is designated. A series of operations shown in FIG. 7 is implemented when the CPU 101 of the facsimile apparatus 100 reads out and executes a control program stored in the ROM 103 (executes the function of each functional unit shown in FIG. 3).

First, in step S701, the filter activation designation unit 308 activates the band-pass filter 306 and advances the process to step S702. In step S702, the filter activation designation unit 308 determines a set reception mode, and if it determines that the set reception mode is the FAX/TEL mode, advances the process to step S703. In step S703, the filter activation designation unit 308 activates the band-reject filter 307 and ends the process. If the filter activation designation unit 308 determines in step S702 that the set reception mode is the TEL answering mode, it advances the process to step S704. In step S704, the filter activation designation unit 308 inactivates the band-reject filter 307 and ends the process. In this case, the band-pass filter 306 corresponds to the first detection unit, and the band-reject filter 307 corresponds to the second detection unit.

<Processing in TEL Answering Mode>

FIG. 8 is a flowchart showing a processing sequence to detect the CNG based on the signal detection state of the filter, which is executed when the TEL answering mode (second mode) is set as the reception mode in the facsimile apparatus 100. A series of operations shown in FIG. 8 is implemented when the CPU 101 of the facsimile apparatus 100 reads out and executes a control program stored in the ROM 103 (executes the function of each functional unit shown in FIG. 3).

When the reception mode is the TEL answering mode, the band-pass filter 306 is active, but the band-reject filter 307 is inactive, as described with reference to FIG. 7. Thus, in the TEL answering mode, the CNG detection determination unit 309 detects the CNG using only the band-pass filter 306. First, in step S801, the CNG detection determination unit 309 obtains the signal detection state of the band-pass filter 306 from the filter unit 305.

Then, in step S802, the CNG detection determination unit 309 determines whether the state of the band-pass filter 306 is the signal detection state. If the CNG detection determination unit 309 determines that the state of the band-pass filter 306 is the signal detection state, it advances the process to step S803 and determines that the CNG has been detected. If the CNG detection determination unit 309 determines that the state of the band-pass filter 306 is not the signal detection state (is the non-detection state), it advances the process to step S804 and determines that no CNG has been detected. After step S803 or S804, the CNG detection determination unit 309 ends the detection processing.

<Processing in FAX/TEL Mode>

Figure 9:
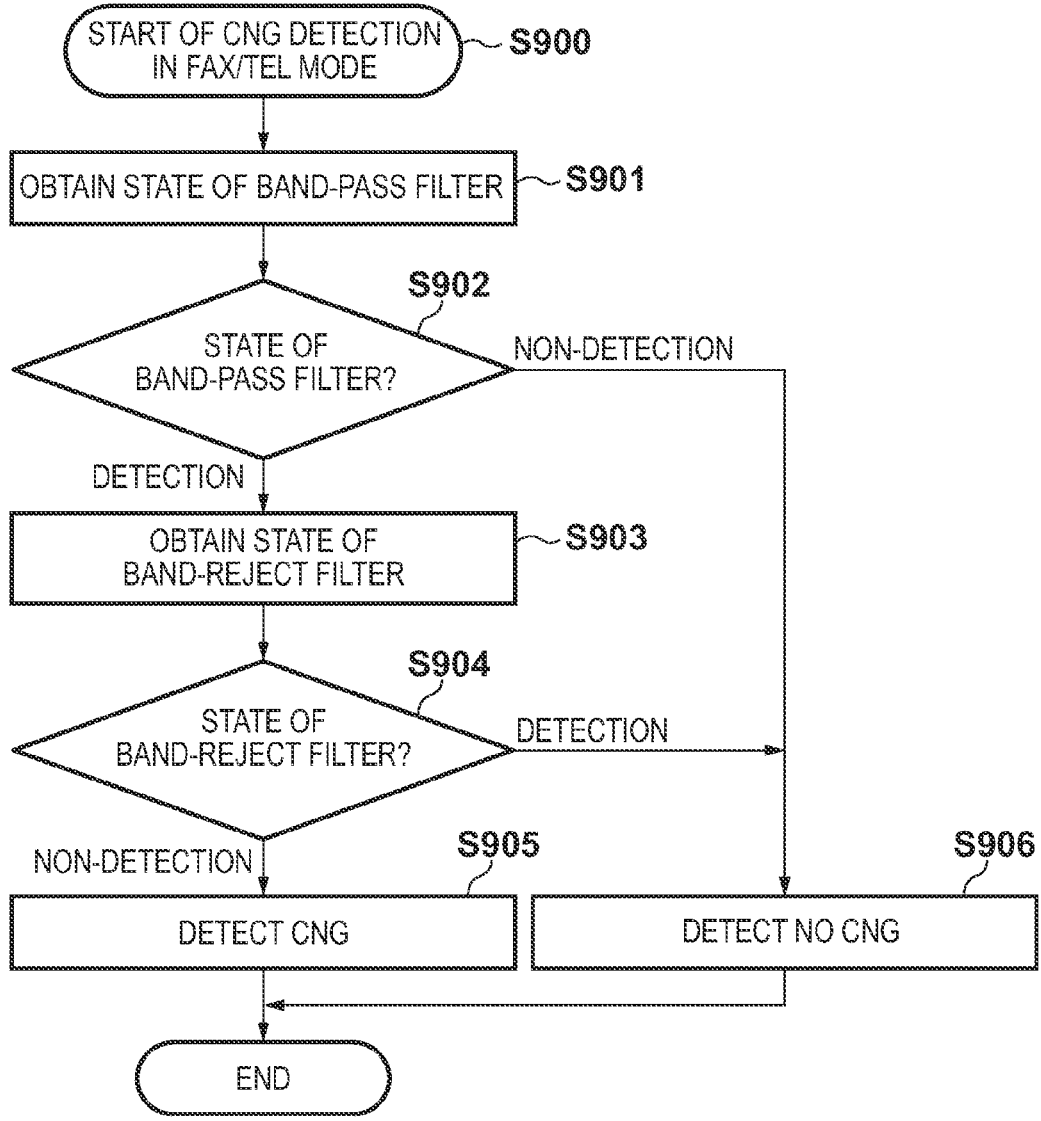
FIG. 9 is a flowchart showing a processing sequence to detect the CNG signal based on the signal detection state of the filter, which is executed when the reception mode is the FAX/TEL mode in the facsimile apparatus 100 according to the embodiment of the present invention.

FIG. 9 is a flowchart showing a processing sequence to detect the CNG based on the signal detection state of the filter, which is executed when the FAX/TEL mode (first mode) is set as the reception mode in the facsimile apparatus 100. A series of operations shown in FIG. 9 is implemented when the CPU 101 of the facsimile apparatus 100 reads out and executes a control program stored in the ROM 103 (executes the function of each functional unit shown in FIG. 3).

When the reception mode is the FAX/TEL mode, both the band-pass filter 306 and band-reject filter 307 are active, as described with reference to FIG. 7. In the FAX/TEL mode, the CNG detection determination unit 309 detects the CNG using both the band-pass filter 306 and band-reject filter 307. First, in step S901, the CNG detection determination unit 309 obtains the signal detection state of the band-pass filter 306 from the filter unit 305.

Then, in step S902, the CNG detection determination unit 309 determines whether the state of the band-pass filter 306 is the signal detection state. If the CNG detection determination unit 309 determines that the state of the band-pass filter 306 is the signal detection state, it advances the process to step S903. If the CNG detection determination unit 309 determines that the state of the band-pass filter 306 is not the signal detection state (is the non-detection state), it advances the process to step S906 and determines that no CNG has been detected.

In step S903, the CNG detection determination unit 309 obtains the signal detection state of the band-reject filter 307 from the filter unit 305. In step S904, the CNG detection determination unit 309 determines whether the state of the band-reject filter 307 is the signal detection state. If the CNG detection determination unit 309 determines that the state of the band-reject filter 307 is not the signal detection state (is the non-detection state), it advances the process to step S905 and determines that the CNG has been detected. If the CNG detection determination unit 309 determines that the state of the band-reject filter 307 is the signal detection state, it advances the process to step S906 and determines that no CNG has been detected.

After step S905 or S906, the CPU 101 advances the process to step S404 of FIG. 4.

As described above, according to the embodiment, the use of the band-pass filter 306 and band-reject filter 307 is determined depending on whether the FAX/TEL mode (first mode) or TEL answering mode (second mode) is set as the operation mode of the facsimile apparatus 100. Further, the CNG is detected from a detection result using the determined filter. This can improve the CNG detection accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-027846, filed Feb. 10, 2011, which is hereby incorporated by reference herein in its entirety.

What is claimed is:

1. A facsimile apparatus which starts facsimile communication upon detecting a CNG signal transmitted from a caller apparatus, comprising:
   a determination unit that determines whether a first mode or a second mode is set as an operation mode of the facsimile apparatus; and
   a signal detection unit that, when said determination unit determines that the operation mode is the first mode, detects the CNG signal using a first detection unit that detects a signal of a frequency band corresponding to the CNG signal and a second detection unit that detects a signal of a frequency band other than the frequency band corresponding to the CNG signal, and when said determination unit determines that the operation mode is the second mode, detects the CNG signal using the first detection unit without using the second detection unit.

2. The apparatus according to claim 1, wherein the second mode is an operation mode in which a response message is transmitted in response to a call from the caller apparatus, and the first mode is an operation mode in which the response message is not transmitted.

3. The apparatus according to claim 1, wherein
when the operation mode is determined to be the first mode, said signal detection unit detects the CNG signal upon detecting a signal by the first detection unit without detecting a signal by the second detection unit, and
when the operation mode is determined to be the second mode, said signal detection unit detects the CNG signal upon detecting a signal by the first detection unit.

4. The apparatus according to claim 1, wherein
the first detection unit includes a band-pass filter which transmits only a signal of the frequency band corresponding to the CNG signal and does not transmit a signal of a frequency band other than the frequency band corresponding to the CNG signal, and
the second detection unit includes a band-reject filter which does not transmit a signal of the frequency band corresponding to the CNG signal and transmits a signal of a frequency band other than the frequency band corresponding to the CNG signal.

5. The apparatus according to claim 2, further comprising a connector that connects a telephone set having a telephone answering function,
wherein the second mode is an operation mode in which a voice message regarding the telephone answering function is transmitted as the response message from the telephone set connected to said connector to the caller apparatus via the facsimile apparatus in response to a call from the caller apparatus until the CNG signal is detected.

6. A method for controlling a facsimile apparatus which starts facsimile communication upon detecting a CNG signal transmitted from a caller apparatus, comprising:
determining whether a first mode or a second mode is set as an operation mode of the facsimile apparatus; and
when the operation mode is determined in the determining whether a first mode or a second mode is set, to be the first mode, detecting the CNG signal using a first detection unit that detects a signal of a frequency band corresponding to the CNG signal and a second detection unit that detects a signal of a frequency band other than the frequency band corresponding to the CNG signal, and
when the operation mode is determined to be the second mode, detecting the CNG signal using the first detection unit without using the second detection unit.

7. A non-transitory computer-readable recording medium recording a computer program for causing a computer to execute steps of the method for controlling the facsimile apparatus according to claim 6.

* * * * *